United States Patent Office 3,278,429
Patented Oct. 11, 1966

3,278,429
SOLID LUBRICANT COMPOSITIONS
Robert J. Agnew, Fishkill, and Kenneth L. Dille, Wappingers Falls, N.Y., assignors to Texaco Inc., New York, N.Y., a corporation of Delaware
No Drawing. Filed Nov. 17, 1964, Ser. No. 411,691
5 Claims. (Cl. 252—28)

This invention relates to new dry lubricant compositions having improved lubrication properties under increased load. More particularly, it pertains to bonded dry film lubricant coating compositions for surfaces containing poly-p-phenylene of an average molecular weight of at least about 3000.

Solid bonded lubricant coatings are well known in the art and are used extensively in the lubrication of bearing surfaces, lathe chucks and other machine tools. In the proper lubrication of moving parts there is present the problem of prevention of galling and seizing when bearing and sliding surfaces are subject to heavy loads per unit area. In the past, powdered molybdenum disulfide has been used in the bonded dry surface lubricant coatings as the lubricity agent. Although molybdenum disulfide efficiently lubricates under high load factors, it has the deficiency of being of a relatively high cost.

An object of the invention is to provide a dry lubricant coating having good load carrying characteristics.

Another object of the invention is to provide a dry coating for bonded surface lubrication containing a lubricity agent of moderate cost.

These and other objects of the invention will become apparent in the following description and claims.

It has been discovered that by combining a lubricating amount of poly-p-phenylene of the general formula:

wherein $n$ is an average integer of at least about 38, with a dry, film forming, surface bonding agent (binder) of the type known to the lubricating art, a solid bonded lubricant coating for surfaces is formed of good load carrying ability. Advantageously, the poly-p-phenylene solid polymer is present in the dry lubricant coating in an amount between about 25 and 75 wt. percent. Further, it is present in a finely divided state, advantageously of between about 2 and 16 micron average particle size.

The poly-p-phenylene lubricity agent may be incorporated into the coating composition, either during or after the preparation of the bonding agent depending on the type of bonding agent. The bonding agent containing the finely divided poly-p-phenylene is normally in the liquefied state when applied to the surface to be lubricated, e.g., via painting or dipping, and the resultant coating subsequently solidifies on the surface, for example, via removal of the liquefying agent, final polymerization of the bonding agent or a combination of both. The mode of coating preparation will, of course, depend upon the use projected for the solid lubricant and upon the particular bonding agent employed. For example, with the phenolic and epoxy resin bonding agents the finely divided poly-p-phenylene is added during the resin production but prior to solidification (curing) of the final resin product. Further, in respect to water soluble metal silicate bonding agent the poly-p-phenylene is added to the aqueous solution of the metal silicate prior to solidification of the bonding agent by evaporation of the water. In any case, the incorporation of the poly-p-phenylene into the bonding agent is desirably accomplished under agitation conditions to insure proper distribution of the solid polymer throughout the bonding agent.

In addition to the bonding agent and poly-p-phenylene lubricity agent, supplementary lubricity ingredients may be included in the lubricant coatings of the invention. Examples of these supplementary lubricity additives are molybdenum disulfide, zinc oxide and graphite of an average particle size of between about 2 and 16 microns. These supplementary additives are normally included in the coating composition at essentially the same point as the poly-p-phenylene incorporation and advantageously present in an amount of between about 1 and 40 wt. percent based on the dry coating.

The coating when applied to a surface is normally applied to give a thickness of approximately between 0.00015 to 0.0005 inch, however, this thickness can be varied depending on the operating clearances of the part lubricated and lubrication requirements. The applied coating is then solidified and bonded to the surface in ways known to the art. For example, when the water soluble metallic silicate is the bonding agent, the poly-p-phenylene is dispersed in the aqueous solution thereof, and the aqueous solution is coated in the surface to be lubricated whereupon the resultant coating is air dried and then cured at an elevated temperature, e.g., 180–300° F. A solid lubricant coating on the surface results. In the case with resin bonding agent the coating can be applied to the surface when the resin formation is incomplete with the resin still in the liquid or adhesive state followed by continued polymerization of the resin until a solid coating bonded to the desired surface is formed.

As heretofore stated, the novel poly-p-phenylene lubricity agent for bonded lubricant coatings is of the general formula:

where $n$ is an average integer of at least about 38 and up to 200 and higher. It is composed of a series of repeating phenylene groups in para position to one another in varying chain lengths with the average chain length being at least about thirty-eight phenylene groups. It is a solid of a brownish to black color with no definite melting point but a decomposition point of about 350° C. It is insoluble in the known solvents such as water, carbon disulfide, ethanol, ethyl ether, petroleum ether, chloroform, benzene, xylene, acetone, hexane and carbon tetrachloride. It is prepared by contacting benzene with an aluminum chloride-cupric chloride condensing combination at a temperature between about 5 and 80° C. Under advantageous conditions, the condensing agent constitutes between about 10 and 40 wt. percent of the reaction mixture and the mole ratio of aluminum chloride to cupric chloride is desirably between about 2:1 and 1:1. Further, under preferred conditions, contact is made for a period of between about 0.25 and 24 hours under agitation conditions with the aluminum chloride and cupric chloride of a particle size of less than about 30 microns, preferably between about 2 and 10 microns. The formed poly-p-phenylene solid is recovered by standard means such as filtration. It is to be noted that in the poly-p-phenylene polymer there may be an insignificantly small amount of ortho branching and cyclization. Further, the polymer may contain as impurity (very small) amounts of substituents other than carbon and hydrogen, for example, chlorine which is derived from the condensing agent employed in the polymer preparation. In addition, the polymer is often associated with impurity amounts of inorganic compounds that become encapsulated by the polymer molecules. The poly-p-phenylene polymers are further described in the article by Kovacic et al., "Polymerization of Benzene to p-Polyphenyl Alumnium Chloride-Cupric Chloride," J. Amer. Chem. Soc. 85, pages 454–458 (1963).

As heretofore stated, the bonding agents employed in the composition of the invention may be any of the known bonding agents known in the solid surface coating lubricant art. For example, one well known class of bonding agents which is suitable are the organic resins such as the phenolic and epoxy resins. Specific examples of the phenolic resins contemplated are the phenol-formaldehyde, phenol-furfural, resorcinol-formaldehyde, cresol-formaldehyde resins either base catalyzed (e.g., $NH_3$) or acid catalyzed (e.g., $H_2SO_4$). One particularly suitable phenolic binder is one prepared by heating phenol with formaldehyde in a weight ratio of 90–95 to 10–5 wt. percent in the presence of ammonia catalyst at a temperature of between about 200–300° F. under an elevated pressure, e.g., 2000 p.s.i.g. for a period of 1 to 5 hours. Specific examples of epoxy resins are the polymeric reaction products of epichlorohydrin and ethylene glycol, glycerol or 4,4'-isopropylidenediphenol. Another class of bonding agents are the water soluble metallic silicates such as sodium silicate and potassium silicate. When aqueous solutions of sodium silicate and potassium silicate are employed for coating application, the $Na_2O$ or $K_2O$ content therein is advantageously between about 5 and 15 wt. percent and the $SiO_2$ content therein is advantageously between 15 and 35 wt. percent. Still other suitable classes of binders and modes of use are disclosed in "Product Engineering," 31, pp. 48–53.

The following examples further illustrate the invention.

EXAMPLE I

This example illustrates the preparation of the poly-p-phenylene extreme pressure agent used in the bonded coatings of the invention.

A slurry of 396 grams (3.0 moles) of aluminum chloride powder and 399 grams (3.0 moles) of anhydrous cupric chloride powder was refluxed with 1500 mls. of dry benzene for a two hour period. The resultant slurry was filtered and the solid was washed repeatedly with an aqueous hydrochloric acid solution until the filtrate was colorless and then with water until neutral. The brownish solid was dried in vacuo to give 80 grams of poly-p-phenylene solid.

Poly-p-phenylene solid of the type prepared above gave the following analysis.

Table I

Description: Results
 Infrared bands, cm.$^{-1}$ ____ 805 (strong), 765 (weak), 695 (weak).
 X-ray d-spacings, A. _____ 4.50, 3.90, 2.10, 2.02.
Elemental analysis, wt. percent:
 Carbon _____ 91.4.
 Hydrogen _____ 5.2.
 Impurity _____ 3.4.
Carbon/hydrogen, atomic ratio _____ 1.46.
Color _____ Brown-black.
Solubility _____ Insoluble in all solvents.
Electrical resistance, ohm-cm. _ $3.5 \times 10^{10}$.
Average molecular weight ____ >3000.

The "impurity" in above Table I is composed primarily of inorganic copper and aluminum compounds entrapped by the polymer molecules as well as a minor amount (e.g., 0.1 wt. percent) of chlorine substituents in the polymer itself.

EXAMPLE II

This example illustrates the preparation and testing of the bonded poly-p-phenylene coatings of the invention.

A dry mixture was first formed by combining 0.55 gram of poly-p-phenylene of an average 9 micron particle size of the type prepared in Example I with 0.10 gram zinc oxide powder and 0.60 gram graphite powder. These three ingredients were mixed to form a dry slurry. To the dry slurry were added 1.25 ccs. of water and 0.38 gram of an aqueous sodium silicate solution containing 11.7 wt. percent $Na_2O$ and 29.2 wt. percent $SiO_2$ and the resultant combination was stirred in order to obtain a uniform mixture. The resultant uniform mixture was then applied to Falex steel pins, which were previously etched with concentrated hydrochloric acid for 15 minutes, rinsed in water and acetone, and then dried to form a coating of approximately about 0.0005 inch thickness. The coated pins were then air dried 1 hour followed by 24 hour drying periods at 180° F. and 300° F. For purposes below the dry bonded coating on the pins was designated as Blend A.

The effectiveness of the poly-p-phenylene containing compositions was determined by a Falex Test which is broadly described in U.S. 2,796,402. The Falex Test consists of a motor driven vertical shaft to which is attached the coated test pin which runs between two V-shaped bearing blocks. The test is conducted under a particular load condition until pin failure is evidenced by seizure of the pin or a sudden increase in the torque reading. The greater the time prior to failure the greater the effectiveness of the lubricating properties of the composition.

Two comparative compositions were also tested, Blend B which is identical to Blend A except 0.55 gram molybdenum disulfide (2-microns) is substituted for the 0.55 gram of poly-phenylene and Blend C which is identical to Blend A except no poly-p-phenylene was included. The results are reported below in Table II.

Table II

| Description of Coating | Time to Failure—minutes | |
|---|---|---|
| | 150 lb. load max. | 200 lb. load max. |
| Blend A | 99 | 95 |
| Blend B | 74 | 118 |
| Blend C | 16 | 10 |

We claim:
1. A bonded dry film composition for surface lubrication comprising a surface bonding agent selected from the group consisting of water soluble metallic silicate, phenolic resin, and epoxy resin containing a lubricating amount of finely divided poly-p-phenylene of the formula:

where $n$ is an average integer of at least about 38.

2. A bonded dry film composition for surface lubrication comprising between about 25 and 75 wt. percent of finely divided poly-p-phenylene of the formula:

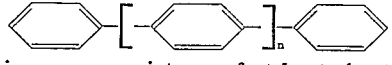

where $n$ is an average integer of at least about 38, of a particle size between about 2 and 16 microns dispersed in a dried water soluble metallic silicate surface bonding agent.

3. A bonded film lubricating composition for coating surfaces comprising on a dry weight basis between about 25 and 75 wt. percent of finely divided poly-p-phenylene of the formula:

where $n$ is an average integer of at least about 38, the remainder of said composition being an aqueous solution of a water soluble metallic silicate, said silicate being present in said aqueous solution in an amount sufficient to form a uniform mixture which upon application to said surfaces develops thereon after evaporation of said water solely by means of said silicate as the binding agent a thin, dry, lubricating film bonded thereto.

4. A composition according to claim 3 wherein said metallic silicate is sodium silicate and wherein said composition also includes on a dry weight basis between about 1 and 40 wt. percent zinc oxide and between about 1 and 40 wt. percent graphite, said poly-p-phenylene, said zinc oxide and said graphite being of a particle size of between about 2 and 16 microns.

5. A bonded dry film composition for surface lubrication comprising between about 25 and 75 wt. percent of a finely divided poly-p-phenylene of the formula:

where $n$ is an average integer of at least about 38, between about 25 and 75 wt. percent of a water soluble metallic silicate, between about 1 and 40 wt. percent of a finely divided zinc oxide and between about 1 and 40 wt. percent of a finely divided graphite, said finely divided poly-p-phenylene, zinc oxide and graphite having a particle size between about 2 and 16 microns.

References Cited by the Examiner
UNITED STATES PATENTS

| | | | |
|---|---|---|---|
| 3,079,204 | 2/1963 | Lamson et al. | 252—28 |
| 3,081,262 | 3/1963 | Goodrich | 252—59 |
| 3,105,054 | 9/1963 | Harris | 252—59 |

References Cited by the Applicant

J. Amer. Chem. Soc. 85, pages 454–458 (1963).
Di Sapio: "Product Engineering" 31 (No. 36), pages 48–53 (Sept. 5, 1960).

DANIEL E. WYMAN, *Primary Examiner.*

I. VAUGHN, *Assistant Examiner.*